INVENTOR.
WARREN F. HEINEMAN
BY
ATTORNEY.

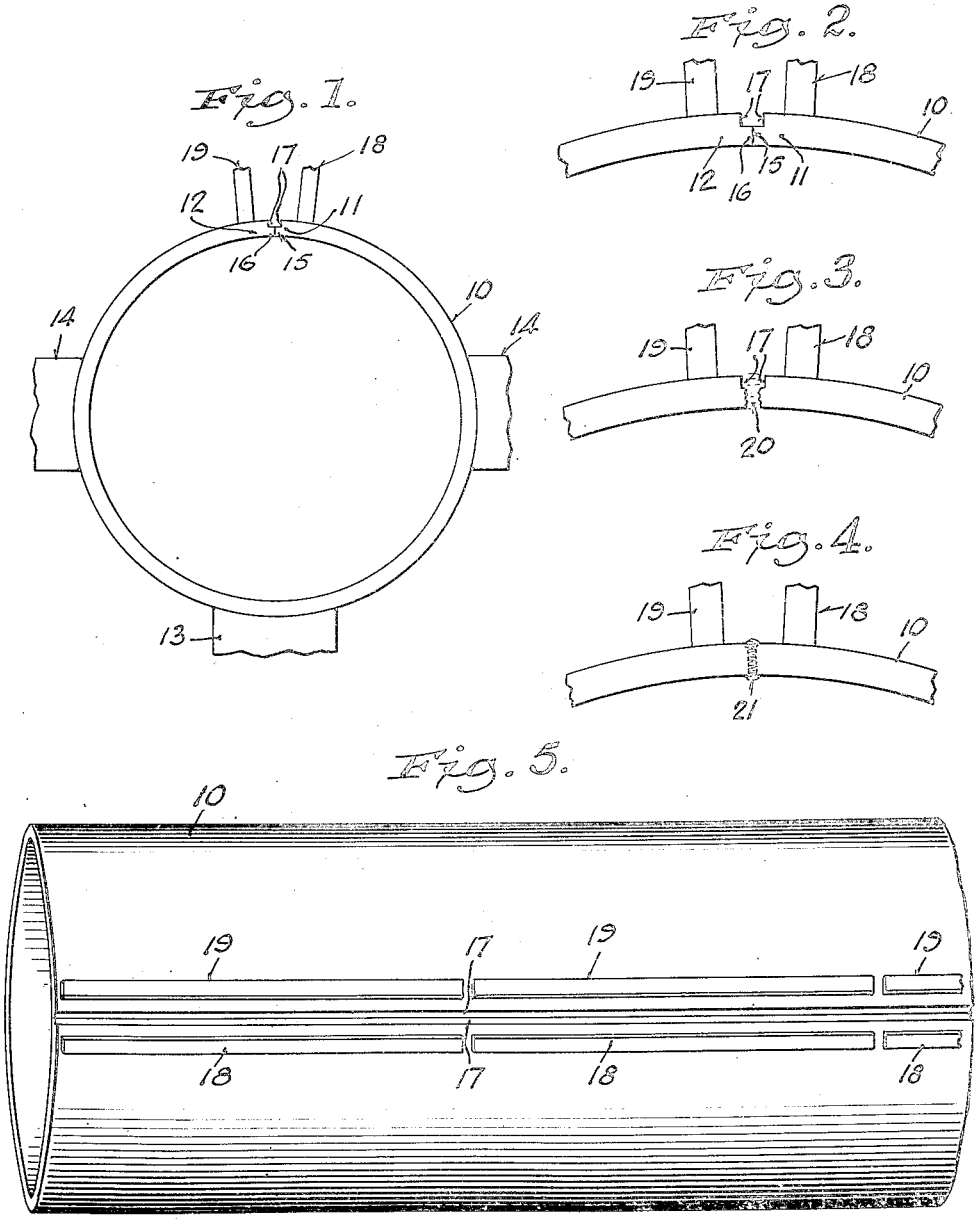

Patented May 10, 1932

1,857,505

UNITED STATES PATENT OFFICE

WARREN F. HEINEMAN, OF SHOREWOOD, WISCONSIN, ASSIGNOR TO A. O. SMITH CORPORATION, OF MILWAUKEE, WISCONSIN, A CORPORATION OF NEW YORK

METHOD OF BUTT WELDING BY MEANS OF A FLASHING ELECTRIC ARC

Application filed March 21, 1928. Serial No. 263,328.

This invention relates to electric welding, and more particularly to that method of electric arc resistance welding known as "flashing."

One object of the present invention is to provide a novel and highly efficient method of electrical welding in the practice of which the desired plasticity of the metal in the vicinity of the joint to be formed is produced by the use of a current of comparatively low amperage.

Another object is the provision of a method of electrical welding which requires a current of minimum amperage for effecting plasticity prior to coalescence of the adjacent parts, and this without maintaining the passage of current therethrough for more than a brief period of time.

A further object is the provision on the aligned and abuting edges of the parts to be welded, of comparatively thin, integral extensions to reduce the area of contact of the edges, which will soon vanish in response to the passage of current therethrough and establish an arc to produce the desired plasticity in the said edges, with a minimum expenditure of electrical energy.

The invention contemplates especially a novel method of producing electrical energy conductance between the reduced abutting edges of two parts arranged in direct contact which it is desired to weld, to effect preheating of such edges and consequent arcing to produce a state of plasticity in the metal of the parts in regions in proximity to the joint to be formed, thereby permitting coalescence of the edges of such parts, without requiring the use of other than an electric current of low amperage.

One very important result flowing from the practice of my present invention in simultaneously and quickly heating for their full length the edges to be welded, and welding such edges in a single operation, resides in the avoidance of the disturbance of the alignment of the edges, due to expansion and contraction, such as usually occurs when the edges are heated and welded progressively along the tube.

The invention will now be described in detail in connection with the several forms shown in the drawings, and the novelty residing in the same will be pointed out in the appended claims.

In the accompanying drawings:

Figure 1 is an end view of a length of pipe formed from sheet metal, and prepared for welding in accordance with my invention, the said view illustrating one manner of treating the meeting edges of the sheet of metal, and showing also certain elements of a welding machine.

Fig. 2 is an enlarged detail view of a portion of the pipe with the meeting edges aligned, and the electrodes in position for welding.

Fig. 3 is a view similar to Fig. 1 showing the gap produced by fusing out the thinned meeting edges of the metal sheet, and indicating the presence of the electric arc in such gap.

Fig. 4 is a similar view showing the edges of the sheet as having been pressed together to effect the welded joint.

Fig. 5 is a plan view, slightly perspective, showing one end of a pipe formed from a metal sheet, with the meeting edges of the latter treated as in Fig. 2 for the purposes of my invention, and with the sectional electrodes disposed in parallel relation at opposite sides of and in proximity to the meeting line of the edges to be welded.

Figure 6:
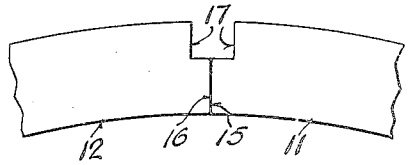
Fig. 6 is an enlarged view of the formation illustrated in Figs. 1 and 2.
Figure 11:
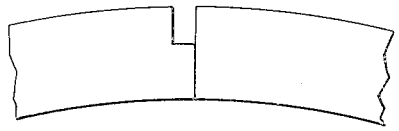
Figs. 11, 12, 13, 14 and 15, are simplifications of the structures illustrated in Figs. 6, 7, 8, 9 and 10, respectively, yet presenting the dominating feature of both.
Figure 7:
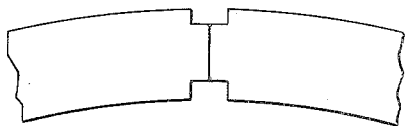
Figs. 7, 8, 9 and 10 illustrate various other modifications in the formation of the meeting edges of the parts to be welded.
Figure 12:
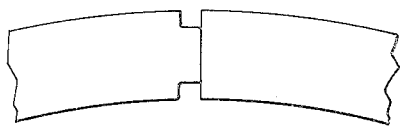
Figure 8:
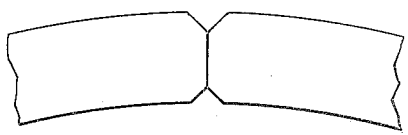
Figure 13:
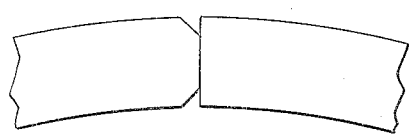
Figure 9:
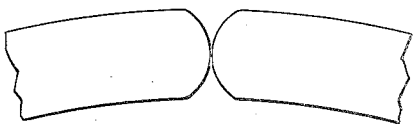
Figure 14:
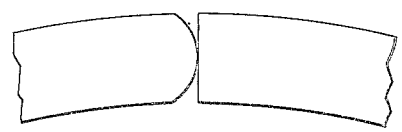
Figure 10:
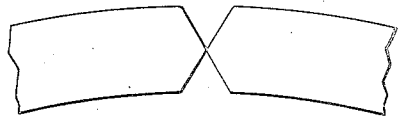
Figure 15:
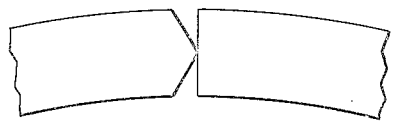

Electric welding by resistance, that is, ordinary butt welding, has largely been commercially adopted to permanently join edges or surfaces of adjacently disposed or abutting metal parts. Edges of any appreciable thickness require excessively large electric current amperages to effect the proper heating and joinder and coalescence of the respective parts. The use of currents of high amperage not only increases the cost of such operations and retards production, but also requires the application of the electrical energy with the utmost care so as to avoid injury to the electrodes, owing to imperfect contacts and excessively high temperatures in the vicinity thereof.

The present invention is designed especially to permit the expeditious production of straight seam, butt welded, sheet metal pipe of extreme lengths, in a single, rapid welding operation, and it has been successfully employed in such production of such pipe having a length of thirty feet. It has been found to be advantageous in the practice of the present invention to thin the meeting edges of the parts to welded, so as to decrease the area of electrical contact between such parts, with the effect that the resistance to the passage of the electrical current through the reduced edges and across the meeting line of the parts is greatly increased, whereby a current of comparatively low amperage will preheat and quickly reduce to fluidity the edges in the region of their decreased area of contact, and so produce by the falling away of the melted portions, a break or gap to establish the desired arcing between the edges and create a welding temperature herein, just prior to coalescence of the edges to be welded.

In the foregoing, I have outlined in general terms the nature and purposes of my invention. More specifically stated, the present invention resides in an improvement on the method of flashing-arc butt welding set forth in Patent No. 1,653,565, granted to me on December 20, 1927. In carrying into practice the method disclosed in that patent, it was first necessary to position and clamp between the plain edges to be welded, a separate and independent resistance element of reduced cross sectional area and surface contact, which element was soon melted away in the resistance offered to the passage therethrough of the welding current. With this melting away of the separate resistance element, an electric arc established itself across the gap between the said edges. The preheating of the edges, which occurred preliminarily to the fusing out and vanishing of the resistance element, was instantly augmented by the action of the arc, and by means of the latter, a very high temperature was attained and state of welding fusion was created immediately in the edges to be welded, which were then pressed together.

The accurate positioning of such separate resistance element with relation to the edges to be welded, as set forth in the said patent, required the exercise of considerable care to locate it properly. The delay due to this operation acted in restraint upon the capacity of the welding machine, and seriously retarded its productive output. In the present invention, that hand operation with its attendant delay is obviated.

While the invention described in the said patent was primarily designed for use in connection with the production of pipe couplings, which are constituted as short, tubular bodies of comparatively thick metal plates, the practice of inserting a separate and independent resistance element in lengthy tubular bodies, such as pipe formed from comparatively thin sheet metal was not feasible, for reasons which are now apparent.

In meeting the problem, instead of inserting a separate and independent resistance element, I now form one or more of the edges to be welded with an integral, reduced or comparatively thin abutting or contacting projection, constituting a longitudinal tongue, extending in the plane of the sheet, which offers in its reduced area of contact the same degree of resistance to the passage of the welding current as is presented by the separately inserted element. The integral reduced projection or tongue is melted away in the resistance to the passage of the current, as in the older practice, and this is accompanied by the flashing of the arc across the gap and between the edges to be welded, for the full length of the latter. The extreme heat of the arc quickly produces a welding temperature, and when a proper state of fusion is created, the edges are then pressed together to produce the welded structure, with the welded line extending the full length thereof.

In the drawings, the numeral 10 indicates a portion of a pipe of extreme length, formed by rolling, pressing, or otherwise converting into tubular form, a metal sheet having a length equal to that of the pipe to be produced therefrom. Ordinarily, the width of the sheet will be equal to the circumference of the pipe. In the converting operation of the sheet into its tubular form, the edges 11 and 12 thereof are brought into aligned and abutting relation. The tube 10 is supported at its lower side upon a bed 13 forming part of the welding machine. The latter is equipped with jaws 14, which are initially actuated by any suitable means to press upon the opposite sides of the tube and bring the edges 11 and 12 together, so as to effect a good electrical contact for the passage of current, in the first instance. The edges 11 and 12 are reduced below the thickness of the sheet so as to have narrow abutting surfaces 15 and 16, the reduction in thickness being accomplished by condensing the metal or machining away one corner of the edges at one side of the sheet, as in Figs. 1 and 2, so as to form at each edge an angular recess 17, extending the full length of the tube.

Electrodes 18 and 19, constructed in sections, are arranged at opposite sides of and in close proximity to the line to be welded, throughout the length of pipe, and connected so as to deliver in all sections of the pipe a current of the same value and thereby produce uniform heating throughout the edges.

The flow of the current across the meeting line is impeded by the resistance offered to its passage through the reduced edges 15 and 16 with the result that the meeting edges of the sheet become preheated, and the further result that the reduced portions are rapidly brought to a state of fluidity which works their destruction. The current in the form of an arc 20, Fig. 3, continues its movement across the gap formed by the falling away of the reduced edges 15 and 16 and immediately brings the metal of the adjacent parts to a state of welding fusion. Thereupon, the jaws 14 of the welding machine are further actuated toward each other to bring the fused edges together and effect their coalescence, and thus complete the tube by welding the edges together for their full length in a single operation. The welded line is indicated 21, in Fig. 4.

In the foregoing, I have described a simple but preferred embodiment of my invention, the same formation being shown enlarged in Fig. 6. But the manner of contouring the reduced edges is capable of variation into other forms, as indicated at Figs. 7 to 10 inclusive, which, in view of what has already been stated, do not require further explanation.

Also, instead of forming complemental meeting edges as in Figs. 6 to 10 inclusive, it will be within my invention to specially form but one of the meeting edges, leaving the other edge plain, as illustrated in Figs. 11 to 15 inclusive. The relation will be clear upon comparing Figs. 11 to 15 with Figs. 6 to 10.

The recess formed in the line of the meeting edges will permit the placing of welding material therein, in case the use of such material in connection with the welding operation be desired.

Having thus described my invention, what I claim and desire to secure by Letters Patent of the United States, is:

1. The method of electrically welding abutting edges together, which consists in reducing the thickness of the abutting edges by providing a recess in the surface extending across their meeting line, passing an electrical current through the edges until a gap is produced therebetween, and pressing the edges heated by the current together to effect their coalescence on a line for their full length.

2. The method of making electrically welded pipe, which consists in converting a metal sheet into tubular form with its edges abutting, forming on one of such edges an integral, longitudinally extending tongue of reduced thickness so as to produce a lessened area of contact and greater resistance to current passage between the edges, pressing the edges together to produce an electrical contact throughout their length, passing a current across the meeting line of the edges to preheat them and melt away the tongue and establish an arc in the gap and create a welding condition in the opposed edges, and then pressing the heated edges together to weld them on a line for the full length of the pipe.

3. The method of making electrically welded pipe, which consists in bending a metal sheet into tubular form with the edges aligned and forming on each of the said edges an integral, longitudinally extending tongue of reduced thickness so as to produce a lessened area of contact and greater resistance to current passage between such edges, pressing the edges together to produce an electrical contact throughout their length, passing a current across the meeting line of the reduced edges to melt away the tongues and establish an arc in the gap thus formed and create a welding condition in the opposed edges, and then pressing the heated edges together to close the gap and weld the meeting edges of the sheet on a line for the full length of the pipe.

4. The method of electric welding extended edges of substantial thickness, which comprises first thinning the edges of the parts to be welded, bringing said reduced edges into contact, applying the welding current across said edges to melt the thinned contacting portions thereof to thereby establish a flashing arc between the edges to be welded for their full common length, and then bringing said edges together under pressure.

5. The method of electric welding extended edges of substantial thickness, which comprises forming a tongue or extension of reduced thickness integral with the metal of one of said edges for substantially the full length of the edge, bringing said tongue or thin extension into contact with the other edge to be welded, passing a current across the meeting line of the edges to melt away the integral tongue or extension and establish a flashing arc between said edges, and thereafter pressing the edges heated by said arc together to weld the same for the full length thereof.

6. The method of electric welding extended edges of substantial thickness, which comprises first thinning one of the edges to reduce the thickness thereof, bringing said edges into contact, applying welding current across said edges to melt the thin contacting portions to thereby establish a flashing arc between the edges to be welded for their full common length, and then bringing said edges together under pressure.

In testimony whereof, I have signed my name at Milwaukee, this 17th day of March, 1928.

WARREN F. HEINEMAN.